United States Patent
Parilla

[11] 3,780,968
[45] Dec. 25, 1973

[54] SOLID PROPELLANT ROCKET ENGINE CONTROL AND MISSILE CONFIGURATIONS

[76] Inventor: Arthur R. Parilla, P.O. Box 127, Mountain Lakes, N.J. 07046

[22] Filed: Dec. 16, 1971

[21] Appl. No.: 208,996

Related U.S. Application Data

[60] Continuation of Ser. No. 784,818, Dec. 18, 1968, which is a division of Ser. No. 607,068, Jan. 3, 1967, Pat. No. 3,489,373, which is a continuation-in-part of Ser. No. 302,222, June 14, 1963, abandoned.

[52] U.S. Cl.................... 244/3.22, 60/234, 60/254, 102/34.5, 102/49.8, 102/100
[51] Int. Cl. ........................... F41g 7/00, F42b 5/18
[58] Field of Search.......................... 244/3.21, 3.22; 102/34.5, 37.7, 49.3, 49.7, 49.8, 99, 100, 101, 104; 60/234, 237, 254, 256

[56] References Cited
UNITED STATES PATENTS

| | | | |
|---|---|---|---|
| 2,500,117 | 3/1950 | Chandler | 60/256 X |
| 2,206,809 | 7/1940 | Denoix | 102/49.7 X |
| 2,489,953 | 11/1949 | Burney | 60/242 X |

Primary Examiner—Benjamin A. Borchelt
Assistant Examiner—James M. Hanley
Attorney—Harry C. Marcus

[57] ABSTRACT

The shaping of solid propellant charges for rocket engines to provide increased acceleration at missile launch without exceeding maximum acceleration near burnout while minimizing missile size and weight. Illustrative is a long-range ballistic missile having multiple rocket engine stages arranged in tandem, in which each stage has a reaction nozzle and associated propellant charge having a shape which is coordinated with the missile flight trajectory including a substantially conical or frusto-conical configuration providing a burning surface which decreases in area with burning time. Variable area reaction nozzles can be employed in each stage in combination with the conically-shaped propellant charges to optimize engine efficiency and increase engine versatility.

2 Claims, 1 Drawing Figure

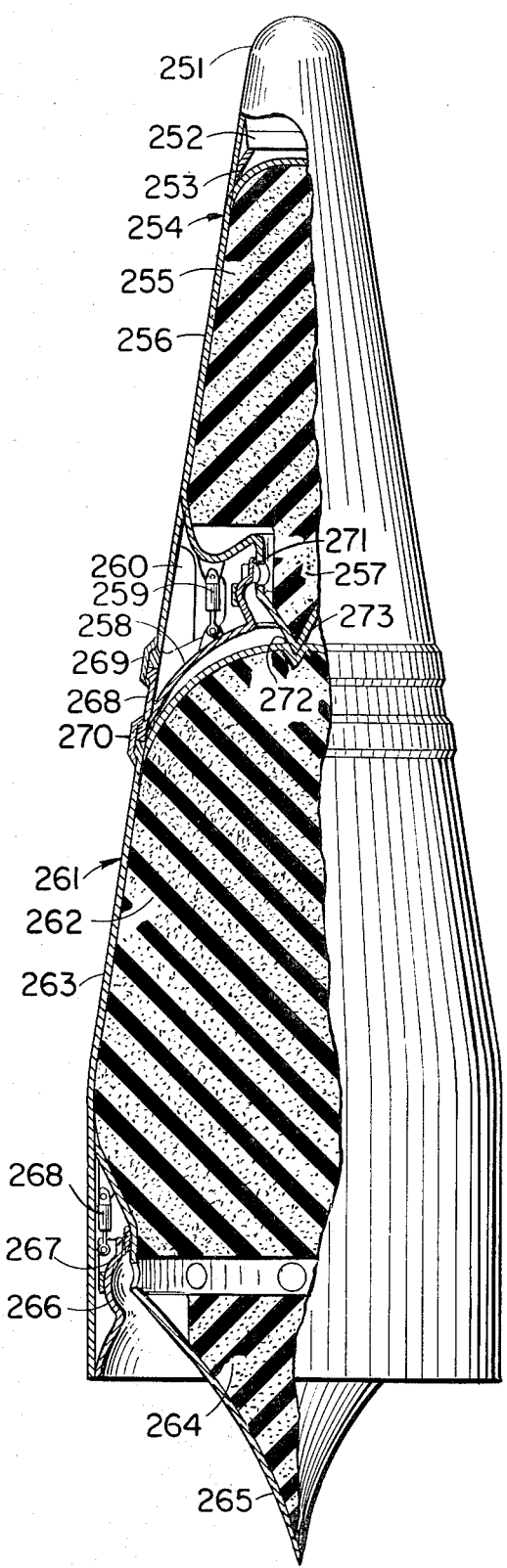

SOLID PROPELLANT ROCKET ENGINE CONTROL AND MISSILE CONFIGURATIONS

RELATED PATENTS AND APPLICATIONS

This is a continuation, of application Ser. No. 784,818, filed Dec. 18, 1968, and now abandoned.

This application is a division of applicant's prior copending application Ser. No. 607,068, filed Jan. 3, 1967 for "Missile Configurations, Controls and Utilization Techniques" which is a continuation-in-part of applicant's prior copending application Ser. No. 302,222, filed June 14, 1963 and now abandoned, for "Aircraft Missiles, Missile Weapons System and Space Craft." Also copending as a division of Ser. No. 607,068 is application Ser. No. 767,583, filed Oct. 3, 1968 for "Missile Configurations, Controls and Utilization Techniques."

The abandoned application, Ser. No. 302,222, was a copending division of application Ser. No. 701,571, filed Dec. 9, 1957 and now U.S. Pat. No. 3,094,072, granted June 18, 1963. An additional application of the applicant, Ser. No. 860,304, is also related to the instant application, being another continuation-in-part of Ser. No. 701,571, and now U.S. Pat. No. 3,151,446.

BACKGROUND AND SUMMARY OF THE INVENTION

The shaping of solid propellant grains as a means of controlling the rate of gas formation during burning to obtain preselected thrust-time characteristics has been a well-known expedient in the design of rocket engines. In the most recent past the emphasis in this area has been on the provision of constant or neutral burning propellant grains in which the rate of gas formation remains substantially uniform with burning time. Hence, the development of the so-called star and wagon wheel shaped grains.

While neutral burning grains are advantageous in some respects, there are serious disadvantages inherent in their use. A neutral burning grain, in providing a uniform rate of gas formation, results in a constant or fixed thrust throughout the total burning time. It is well known that when missiles are equipped with constant thrust rocket engines, the missile acceleration increases as the missile mass decreases due to propellant consumption. Since the weight of the propellant constitutes a very large portion of the total missile, a large variation in missile acceleration can occur with constant thrust rocket engines.

Attempts have been made in the past to provide regressive burning grains; i.e., grains whose inherent rate of gas formation decreases with burning time. Efforts in this connection have been concentrated on the formation of rod-shaped grains in which burning takes place on the outer cylindrical surface. Such configurations have proven highly unsuccessful due in large measure to added weight resulting from the need for support of the rod-shaped grain and insulation of the missile case walls. In fact, the mass ratios of such rockets have been so low as to preclude practical utilization.

Most rocket engines today are designed to operate at fixed thrust levels. Among the objects of the instant invention are the following:

To provide a solid propellant rocket engine which provides increased acceleration at missile launch while inherently limiting maximum acceleration near burnout.

To provide a rocket engine characterized by the above whose mass ratio, i.e., the ratio of the mass of the propellant to total mass, is maximized.

To provide a rocket engine characterized by the above which makes maximum utilization of the propellant for producing thrust during all phases of missile flight.

To provide a rocket engine characterized by the above having a thrust-time characteristic which is coordinated with the rate of decrease of the mass of the missile as the propellant is being consumed.

To provide a solid propellant rocket engine characterized by the above having a thrust-time characteristic which is coordinated with the missile flight trajectory.

To provide a solid propellant rocket engine characterized by the above having reduced overall size and weight.

To provide improved anti-ballistic missile weapon systems for local defense against ballistic missile attack and for improved ground-to-air defense.

The foregoing and other objects, features and advantages are accomplished in accordance with the instant invention by the provision of a solid propellant rocket engine whose grain is tapered or conical in configuration to provide a rate of gas formation which decreases with burning time. In the illustrative embodiment, a missile has a plurality of rocket stages in tandem, each stage having a tapered or substantially conical or frusto-conical end burning propellant grain to provide a burning surface which decreases in area with burning time, the separate grains also conjointly defining an overall conical or frusto-conical geometrical configuration. It is preferred that the outer case of the missile also have a substantially conical shape conforming to the configuration of the propellant grain or grains.

In one preferred embodiment, each stage has a variable area reaction nozzle responsive to variations in combustion chamber pressure to maintain such pressure at a constant while optimizing the nozzle thrust coefficient as a function of missile altitude.

It can be seen that a self-throttling rocket engine of reduced weight and size is provided which automatically coordinates thrust with other parameters to obtain maximum utilization of propellant fuel for increased engine efficiency and flexibility while providing increased acceleration at launch and reduced acceleration near burnout.

Reference will now be had to the drawings in which the single FIGURE is a partially diagrammatic elevational view of a long-range ballistic missile embodying the invention, with portions of the missile being broken away and shown in section.

In the missile, which provides improved performance, 251 is the warhead, and 252 is a guidance system supported by the airframe 253. The second stage rocket 254 contains a solid propellant, 255, within a rocket case, 256. Additional propellant 257 may provide higher loading density, filling the space within the nozzle plug, 273. The variable area cowl and expansion cone, 258 is attached by the bellows 271 and actuators 259 to the case 256. Control system 260 for the missile may be mounted in the second stage between the nozzle 258 and the case, 256.

The first stage 261 and the second stage 254 are joined by the split collar 268 and the upper and lower clamps 269 and 270.

The first stage rocket contains propellant 262 within the case 263, with additional propellant 264 filling the space within the nozzle plug 265, increasing loading density. The cowl and expansion cone 266 is attached to the case by the bellows 267 and actuators 268, the details being as previously described.

The propellant grains for both first and second stages are designed to provide the desired regressive characteristics. This, then, permits automatic reduction of thrust as a function of time, permitting higher acceleration at launch without exceeding maximum acceleration near burnout. The grain regressivity is selected to permit automatic operation of the variable nozzle area expansion ratio and, hence, improve nozzle thrust coefficient as a function of altitude, using time as a common parameter. Both of these purposes may now be accomplished with no additional controls other than the means described for positioning the nozzle cowl in the aforesaid copending application Ser. No. 607,068, such as the mechanical or fluid springs, or the controllable solid propellant systems described therein. Any of these methods, of course, will still provide minimum case weight by acting as constant pressure devices independent of ambient temperatures; they will also act to minimize thrust variation with ambient temperature changes, as described.

While the propellant grains may have any configuration so long as the desired regressivity is obtained, for the purpose of illustration, an end-burning grain is shown which has a tapered or conical cross-section which reduces in area as burning progresses. In the illustration shown in the FIGURE, ignition may occur on both surfaces of the two grains 262 and 264 is Stage 1 rocket engine. The burning surface then remains substantially constant for the first portion of the burning time, the progressivity of grain 262 after ignition being reduced by the regressivity of grain 264. Small variation in grain geometry particularly increased burning area, will have little serious effect since the nozzle cowl will extend automatically, increasing throat area, eliminating pressure peaks. This permits greater freedom in attaining high loading densities.

When the first stage is ignited (by conventional means not shown) the nozzle cowl 266 assumes its normal design position, as by compression of the springs or actuators 268. In this position, the area expansion ratio may be approximately 5, corresponding to optimum thrust coefficient at sea-level with a chamber pressure of 500 psia. As the missile gains altitude, the chamber pressure and mass flow rate remain constant during an initial period, as long as burning surface remains constant. After a time, $t_1$, the missile would be at an altitude at which the pressure ratio will have increased to a value causing the jet diameter to increase to the full nozzle diameter. The area ratio, with constant cowl position, may now be 10, corresponding to an optimum nozzle coefficient at an altitude of 25,000 feet. As the missile continues to climb, the grain becomes regressive. The reduced value of K (the ratio of burning surface to nozzle throat area) as burning surface reduces would tend to reduce chamber pressure. The springs (or control system) 268 then cause the nozzle cowl 266 to retract, the reduced throat area reducing thrust as constant pressure is maintained, and increasing the expansion ratio. As an example, when burning has progressed to a section where the propellant burning surface was approximately one-half of its initial value, the mass flow rate is reduced to one-half its initial value; the throat area also reduces to one-half of its initial value thereby again doubling the nozzle expansion ratio approaching a value of 20. This would now correspond to an optimum ratio and optimum thrust coefficient at approximately 45,000 feet altitude with the constant chamber pressure of 500 psia.

Referring to standard references showing the relationship of nozzle thrust coefficient as functions of pressure ratio and area ratio, it may be seen that the variable area expansion ratio increases the nozzle thrust coefficient and, hence, the propellant specific impulse by more than 10 percent at upper altitudes, while still maintaining optimum nozzle coefficient at sea-level. In view of the large propellant masses required for long range missiles, this permits substantial reduction in actual propellant weight, with corresponding reduction in missile size and case weight.

When this same feature is used in upper stages, together with maximum nozzle expansion ratios, the higher specific impulse makes possible reduced propellant weight of upper stages. This saving is magnified by reduced weight of lower stages, substantially reducing take-off weight, and size of the missile as a whole.

Thus, it may be seen that by the use of a regressive burning propellant, whose design is coordinated with the missile flight trajectory, simple control means may be provided whereby the rocket engine automatically increases the nozzle expansion ratio and thrust coefficient as a function of altitude. The resulting grain regressivity then also reduces thrust automatically as propellant is consumed, inherently providing throttling to restrict maximum acceleration as the mass of the missile reduces.

Upon first stage burnout, the clamps 269 and 270 are released. This may be accomplished by explosive bolts, or by a quick release mechanism responsive to loss of chamber pressure in the first stage. The ring 268, which is split circumferentially into two segments, falls away providing clearance for the large expansion cone of the second stage nozzle 258 to oscillate for vector control.

The second stage rocket engine is made regressive to accomplish the same variable expansion ratio and also to restrict maximum acceleration, as with the first stage. The expansion ratio may increase from, say, 40 after ignition, to twice that value as the missile continues to climb.

The second stage nozzle is designed to utilize the maximum cross-sectional area available within the missile envelope, thus providing maximum nozzle thrust coefficient at the extremely high pressure ratios in and beyond the upper atmosphere. It may be of the internal expansion type, described and illustrated in FIG. 4 of the aforesaid copending application Ser. No. 607,068. Since second stage ignition occurs only after high altitudes are reached, the high pressure ratios result in high Prandtl-Meyer angles. The nozzle may therefore have a large angle at the throat, followed by a contoured divergent section.

The flow undergoes expansion beyond the throat, followed by some recompression as it is directed aft in an axial direction. Thus, extremely large area expansion ratios may be obtained within relatively short nozzle lengths.

Overall missile length may be reduced by nesting the upper head closure of the first stage within the nozzle expansion cone of the second stage. Clearance for the plug tip of the second stage nozzle may be provided by a recess in the first stage head closure, if required, as at 272, and for alignment of successive stages.

The double release clamps 269 and 270 and split ring 268 may be replaced by a single clamp or equivalent fitting. This would reduce the nozzle expansion cone to insure sufficient clearance on separation. The higher nozzle thrust coefficient and higher specific impulse with the larger expansion cone would save propellant weight when the two clamps are used.

Thrust vector control, as well as thrust termination may, of course, be incorporated with the variable area nozzles as previously described in the aforesaid copending application Ser. No. 607,068.

Multiple stages exceeding two may, of course, be used. The conical grain is illustrative only of regressive burning grain. A cylindrical missile having cylindrical grains may, of course, be used, the desired regressivity being obtained by other grain geometries.

The propellant burning rate may be made regressive, rather than burning surface. This may be controlled by varying propellant composition, use of one or more grains; or by controlling or varying the length of wires sometimes embedded within the propellant grain to increase the burning rate; the number of wires per unit of cross-section being varied along the length of a cylindrical grain.

As an aid to understanding the invention, the applicant's prior copending and related patents and applications previously cited herein should be reviewed. These patents and applications illustrate instrumentalities and techniques for varying the throat area and other geometric parameters of nozzles employed in thrust producing devices including examples of a number of embodiments for varying the throat area and stream orientation in rocket engine nozzles to achieve variations in expansion ratio, chamber pressure, pressure ratio, propellant specific impulse, thrust magnitude and direction, and related parameters.

The invention in its broader aspects is not limited to the steps, arrangements, instrumentalities and combinations shown and described herein for illustrative purposes, and departures may be made therefrom by those skilled in the art without departing from the spirit and scope of the invention as defined in the appended claims and without sacrificing its chief advantages.

What is claimed is:

1. A missile comprising an outer case defining a combustion chamber for a propellant grain; a regressive-burning propellant grain in said combustion chamber; and, a variable throat area reaction nozzle movably connected to said case for receiving gas issuing from said combustion chamber, said nozzle being movable in response to the mass flow rate of gas issuing from said chamber to vary said throat area for maintaining a substantially constant pressure within said combustion chamber from Sea-Level to an attained altitude as the rate of gas formation in, and the mass flow rate of gas issuing from, said chamber decreases with time, the regressive-burning characteristics of said grain being selected to maintain a substantially constant ratio between the mass flow rate of gas issuing from said chamber and the throat area of said nozzle, with time, and to provide sufficient initial generation of propellant gases to accelerate said missile during launch without exceeding maximum acceleration near burnout, whereby, at constant chamber pressure from Sea-Level to the attained altitude, the thrust coefficient of said nozzle increases from an optimum coefficient at Sea-Level to an optimum coefficient at the attained altitude.

2. A missile comprising an outer case, a plurality of separable rocket stages arranged in tandem for sequential firing in propelling said missile, each of said stages having a reaction nozzle in operative communication with an associated solid propellant charge within said outer case, and said propellant charges being formed to individually and conjointly have a generally conical geometrical configuration to provide a burning surface which decreases in area with the burning time of each stage.

* * * * *